United States Patent
Grupe

(10) Patent No.: US 8,949,976 B2
(45) Date of Patent: *Feb. 3, 2015

(54) SCANNING COMPUTER FILES FOR SPECIFIED CONTENT

(75) Inventor: Robert Grupe, Hertfordshire (GB)

(73) Assignee: McAfee Inc., Santa Clara, CA (US)

( * ) Notice: Subject to any disclaimer, the term of this patent is extended or adjusted under 35 U.S.C. 154(b) by 1989 days.

This patent is subject to a terminal disclaimer.

(21) Appl. No.: 11/372,611

(22) Filed: Mar. 10, 2006

(65) Prior Publication Data

US 2013/0247200 A1 Sep. 19, 2013

Related U.S. Application Data

(63) Continuation of application No. 09/881,058, filed on Jun. 15, 2001, now Pat. No. 7,043,758.

(51) Int. Cl.
*G06F 21/00* (2013.01)
*G06F 21/50* (2013.01)
*H04L 29/06* (2006.01)
*G06F 21/56* (2013.01)

(52) U.S. Cl.
CPC ............ *G06F 21/50* (2013.01); *H04L 63/1433* (2013.01); *H04L 63/145* (2013.01); *G06F 21/562* (2013.01)
USPC .............................................. 726/22; 726/24

(58) Field of Classification Search
USPC ..................................................... 726/22–25
See application file for complete search history.

(56) References Cited

U.S. PATENT DOCUMENTS

| | | | |
|---|---|---|---|
| 5,050,213 A | 9/1991 | Shear | |
| 5,454,071 A | 9/1995 | Siverbrook et al. | |
| 5,634,111 A | 5/1997 | Oeda et al. | |
| 5,881,151 A * | 3/1999 | Yamamoto | ....................... 726/24 |
| 5,960,170 A | 9/1999 | Chen et al. | |
| 5,974,392 A * | 10/1999 | Endo | ........................... 705/7.14 |
| 5,987,610 A | 11/1999 | Franczek et al. | |
| 6,016,546 A * | 1/2000 | Kephart et al. | ................. 726/24 |
| 6,021,510 A | 2/2000 | Nachenberg | |
| 6,073,142 A | 6/2000 | Geiger et al. | |
| 6,098,091 A * | 8/2000 | Kisor | ........................... 709/202 |
| 6,112,225 A * | 8/2000 | Kraft et al. | |
| 6,138,174 A * | 10/2000 | Keeley | .............................. 710/5 |
| 6,260,145 B1 | 7/2001 | Komura et al. | |
| 6,320,965 B1 | 11/2001 | Levine | |
| 6,393,568 B1 | 5/2002 | Ranger et al. | ................. 713/188 |

(Continued)

OTHER PUBLICATIONS

Steve R. White, Morton Swimmer, Edward J. Pring, William C. Arnold, David M. Chess and John F. Morar, "Anatomy of a Commercial-Grade Immune System", 1999, CiteSeer, pp. 1-28.*

(Continued)

*Primary Examiner* — Edward Zee
*Assistant Examiner* — Chi Nguy
(74) *Attorney, Agent, or Firm* — Patent Capital Group

(57) ABSTRACT

Scanning for computer viruses or E-mail and data content filtering is performed using a distributed programming approach. A master computer 4 serves to divide the scanning operation into a plurality of tasks that are allocated to further computers 8, 10, 12, 14, 20. These further computers then separately perform the tasks and return the results to the master computer 4. The master computer 4 can check the update status of the further computers prior to them starting operation in order to check that they have the latest data defining the scanning to be performed.

22 Claims, 4 Drawing Sheets

(56) References Cited

U.S. PATENT DOCUMENTS

| | | | |
|---|---|---|---|
| 6,407,680 B1* | 6/2002 | Lai et al. | 341/50 |
| 6,460,050 B1 | 10/2002 | Pace et al. | |
| 6,499,107 B1* | 12/2002 | Gleichauf et al. | 726/23 |
| 6,578,147 B1* | 6/2003 | Shanklin et al. | 726/22 |
| 6,665,395 B1* | 12/2003 | Busey et al. | 379/265.09 |
| 6,748,534 B1* | 6/2004 | Gryaznov et al. | 713/188 |
| 6,774,913 B1 | 8/2004 | Varga et al. | |
| 6,779,182 B1* | 8/2004 | Zolnowsky | 718/103 |
| 6,802,012 B1* | 10/2004 | Smithson et al. | 726/24 |
| 6,851,058 B1* | 2/2005 | Gartside | 726/24 |
| 6,952,776 B1 | 10/2005 | Chess | |
| 7,043,757 B2* | 5/2006 | Hoefelmeyer et al. | 726/24 |
| 7,043,758 B2 | 5/2006 | Grupe | 726/24 |
| 7,082,474 B1* | 7/2006 | Hubbard | 709/245 |
| 7,188,367 B1* | 3/2007 | Edwards et al. | 726/24 |
| 7,243,373 B2 | 7/2007 | Muttik et al. | 726/24 |
| 7,346,928 B1* | 3/2008 | Muhlestein | 726/24 |
| 7,346,929 B1* | 3/2008 | Hammond | 726/25 |
| 7,418,506 B1* | 8/2008 | Achtermann et al. | 709/227 |
| 7,433,941 B1* | 10/2008 | Lavian et al. | 709/223 |
| 7,506,155 B1 | 3/2009 | Stewart et al. | |
| 8,249,940 B2* | 8/2012 | Hubbard | 705/26.1 |
| 2002/0143850 A1* | 10/2002 | Caronni et al. | 709/201 |
| 2002/0152307 A1* | 10/2002 | Doyle et al. | 709/225 |
| 2002/0166085 A1* | 11/2002 | Peikari | 714/38 |
| 2002/0174358 A1* | 11/2002 | Wolff et al. | 713/200 |
| 2002/0194487 A1 | 12/2002 | Grupe | 713/200 |
| 2003/0018762 A1* | 1/2003 | Mullen | 709/223 |
| 2004/0148281 A1 | 7/2004 | Bates et al. | |
| 2005/0086499 A1* | 4/2005 | Hoefelmeyer et al. | 713/188 |

OTHER PUBLICATIONS

U.S. Appl. No. 09/911,765, filed Jul. 25, 2001.
Final Office Action Summary from U.S. Appl. No. 09/911,765 which was mailed on Jan. 12, 2007.
Office Action Summary from U.S. Appl. No. 09/911,765 mailed on Dec. 13, 2005.
Office Action Summary from U.S. Appl. No. 09/911,765 mailed on Jun. 6, 2006.
Notice of Allowance from U.S. Appl. No. 09/911,765 mailed on Apr. 19, 2007.
Corrected Notice of Allowance from U.S. Appl. No. 09/911,765 mailed on May 3, 2007.

* cited by examiner

SCANNING COMPUTER FILES FOR SPECIFIED CONTENT

This application is a continuation of previously U.S. patent application Ser. No. 09/881,058 filed on Jun. 15, 2001, now U.S. Pat. No. 7,043,758, the disclosure of which is incorporated herein by reference.

BACKGROUND OF THE INVENTION

1. Field of the Invention

This invention relates to the field of data processing systems. More particularly, this invention relates to data processing systems in which it is desired to scan a plurality of computer files to identify one or more computer files having one or more predetermined characteristics indicative of a computer file having at least some specified content.

2. Description of the Prior Art

It is known to provide anti-virus computer programs and E-mail and data filtering programs. Anti-virus and content filtering computer programs may operate in an on-access mode or an on-demand mode. In an on-access mode, when an access request is made to a computer file, that computer file is subject to scanning for computer viruses, worms, Trojans or other undesired content using a library of data defining such content to be detected. In an on-demand mode, a user initiated or scheduled request may be made to scan a portion of or a complete volume of data with all the computer files contained in that volume being subject to scanning to some degree, even if this is merely to determine they are of a type that does not need scanning.

In a similar manner, network transport filtering programs may operate to scan incoming or outgoing E-mail messages and other data streams for undesired content. This may take place as the data is flowing in and out, or alternatively may take place in a scheduled on-demand sense whereby a complete volume of data is scanned as a scheduled or user triggered event.

A problem in both the above systems is that the amount of data that needs scanning is rapidly increasing. Furthermore, the number of computer viruses and other undesired forms of content is also rapidly increasing. These factors combine to significantly increase the processing load to carry out such tasks. The situation can arise when the amount of slack time, such as overnight periods or weekend periods, is insufficient to allow on-demand scans to be run within the period available. This can have the result that such scans need to be terminated early without fully completing thereby potentially significantly compromising the security and usefulness of such systems.

SUMMARY OF THE INVENTION

Viewed from one aspect the present invention provides a computer program product comprising a computer program operable to control a master computer to scan a plurality of computer files to identify one or more computer files having one or more predetermined characteristics indicative of a computer file having at least some specified content, said computer program comprising:

scan initiating logic operable in response to a scan initiating command to initiate a scan of said plurality of computer files;

scan dividing logic operable to divide said scan into a plurality of tasks;

task issuing logic operable to issue at least some of said plurality of tasks to one or more further computers to be performed by respective ones of said one or more further computers;

task result receiving logic operable to receive from said one or more further computers results of said tasks performed by respective ones of said one or more further computers; and scan result merging logic responsive to said results of said tasks performed by respective ones of said one or more further computers to identify any of said plurality of computer files having any of said one or more predetermined characteristics to provide a merged scan result.

The invention recognises that the concepts of distributed processing may be applied to such scanning for specified content using one or more predetermined characteristic tests. The full scan to be performed may be broken down into separate tasks that can be spread out between more than one computer thereby decreasing the total time required for the scanning. This type of scanning operation is particularly well suited to such distributed processing since it is highly computationally intensive and yet for the vast majority of time the results produced are null results requiring very little feedback of data to the central source. This makes such a distributed approach quite practical since in the vast majority of cases a block of data that is, for example, passed out for virus scanning will not reveal any viruses thus requiring very little data to be passed back to the co-ordinating source and allow a comparatively simple structure and arrangement of the system.

It will be appreciated that whilst the invention is suitable for scanning for specified content of a variety of types within large numbers of computer files, it is particularly well suited to computer virus/worm/Trojan detection and electronic messaging filtering situations.

The action taken upon detection of a computer file with unwanted content could vary, but typically will include banning that computer file from use, quarantining that computer file or redirecting a message or file for checking elsewhere.

The computer files being scanned may typically reside upon the network drive of a server computer. However, more generally the computer files may be stored on one or more networked data storage devices. It is becoming more common for distributed data storage to be provided within networks. The present techniques could also be applied for scanning the local hard drives of client computers if desired.

The master computer that controls the distributed processing may also perform some of the scanning operations itself. In these circumstances, high priority scanning operations may be kept to be performed by the master computer with lower priority scanning being distributed to further computers. As an example, the master computer may choose to scan for a subset of the total number of computer viruses or worms or Trojans that are known to be the most damaging/common/recent of the total number scanned for and accordingly the ones for which it is most critical to check.

The master computer may preferably be arranged to monitor the performance of the further computers to which the processing is distributed. The master computer may poll the further computers for their reported status in conducting the processing that has been distributed to them and/or may operate a timeout function whereby if a response from a further computer is overdue, then the task that was allocated to that further computer is allocated elsewhere. In such circumstances, diagnostic operation may be commenced with the further computer to determine whether further tasks should be sent to that computer.

With the advent of "PC on a card" type computers, it is possible for the one or more further computers that co-operate with the master computer to be provided connected to the system bus of the master computer thereby achieving high efficiency distributed processing.

Viewed from another aspect the invention provides a computer program product comprising a computer program operable to control a computer to scan a plurality of computer files to identify one or more computer files having one or more predetermined characteristics indicative of a computer file having at least some specified content, said computer program comprising:

task receiving logic operable to receive a task request from a master computer specifying a portion of a larger scan operation;

task performing logic operable to perform said portion of a larger scan operation; and result reporting logic operable to report a result of said portion of a larger scan operation to said master computer.

It will be appreciated that the computer program executing on the master computer to initiate and co-ordinate the distributed scanning together with the computer program executing on the further computers together represent complementary aspects of the same invention.

In order to improve the reliability and security of the scanning, the further computers may be arranged to provide update status information to the master computer (possibly upon request by the master computer) such that the master computer can determine if the further computer has the latest data for identifying the specified content required for the scan.

Further computers may be made available in accordance with a predetermined schedule or possibly on a more ad-hoc basis. Scheduled availability could be arranged via scheduling on the further computer or by request from the master computer. An ad-hoc approach could be catered for by an availability notification being issued from the further computers to the master computers, such as upon commencement of execution of a screen saver program indicating that the computer was not in active use by a user.

Complementary aspects of the invention also provide a method of controlling a computer and a computer apparatus.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
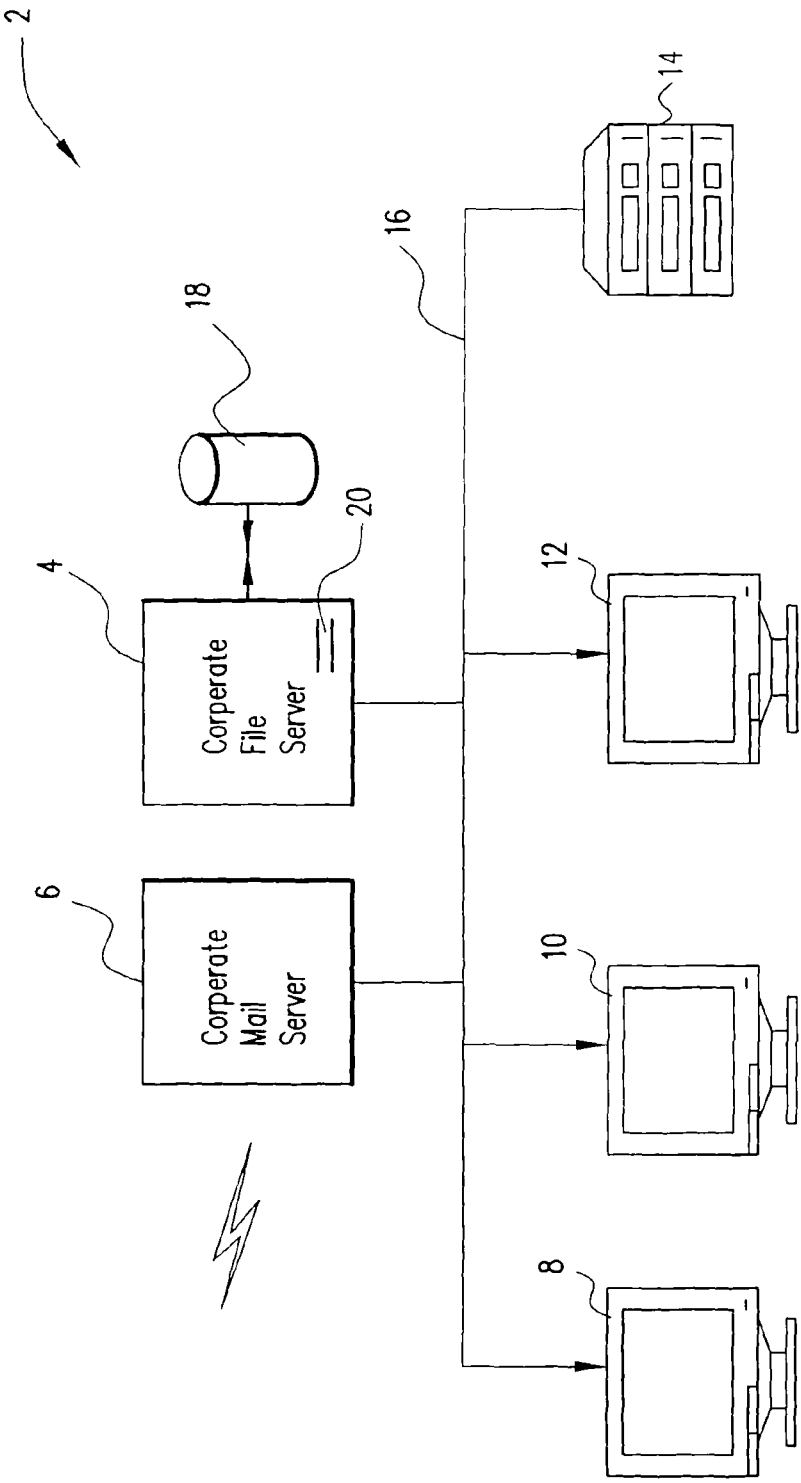
FIG. 1 illustrates a computer network.

FIG. 1 illustrates a computer network 2 including a file server 4, a mail server 6, a plurality of client computers 8, 10, 12 and a plurality of rack mounted appliance computers 14. A local area network 16 connects these computers.

The file server 4 includes a network storage device 18 providing file storage for the computers connected to the local area network 16. The file server 4 also includes two computers 20 implemented as PC computers on cards connected to the system bus of the file server 4.

In operation, the network storage device 18 is subject to regular on-demand scans to identify computer viruses, Trojans or worms. As the network storage device 18 can be very large, the amount of processing to compare every file stored against a large and ever growing number of virus definition profiles can also be very large. This can result in insufficient time being available to complete a full on-demand scan during the scheduled inactive periods of the network. As another example, the mail server 6 may include a network storage device storing all the received and sent E-mails into and out of the network and these may be subject to on-demand content filtering during quiet periods of network activity. A further example may be that the local hard disk drives of the client computer 8, 10, 12 may be subject to virus scanning co-ordinated and driven by the file server 4 during quiet network periods providing that those local hard disk drives are shared and available for access over the network.

Figure 2:
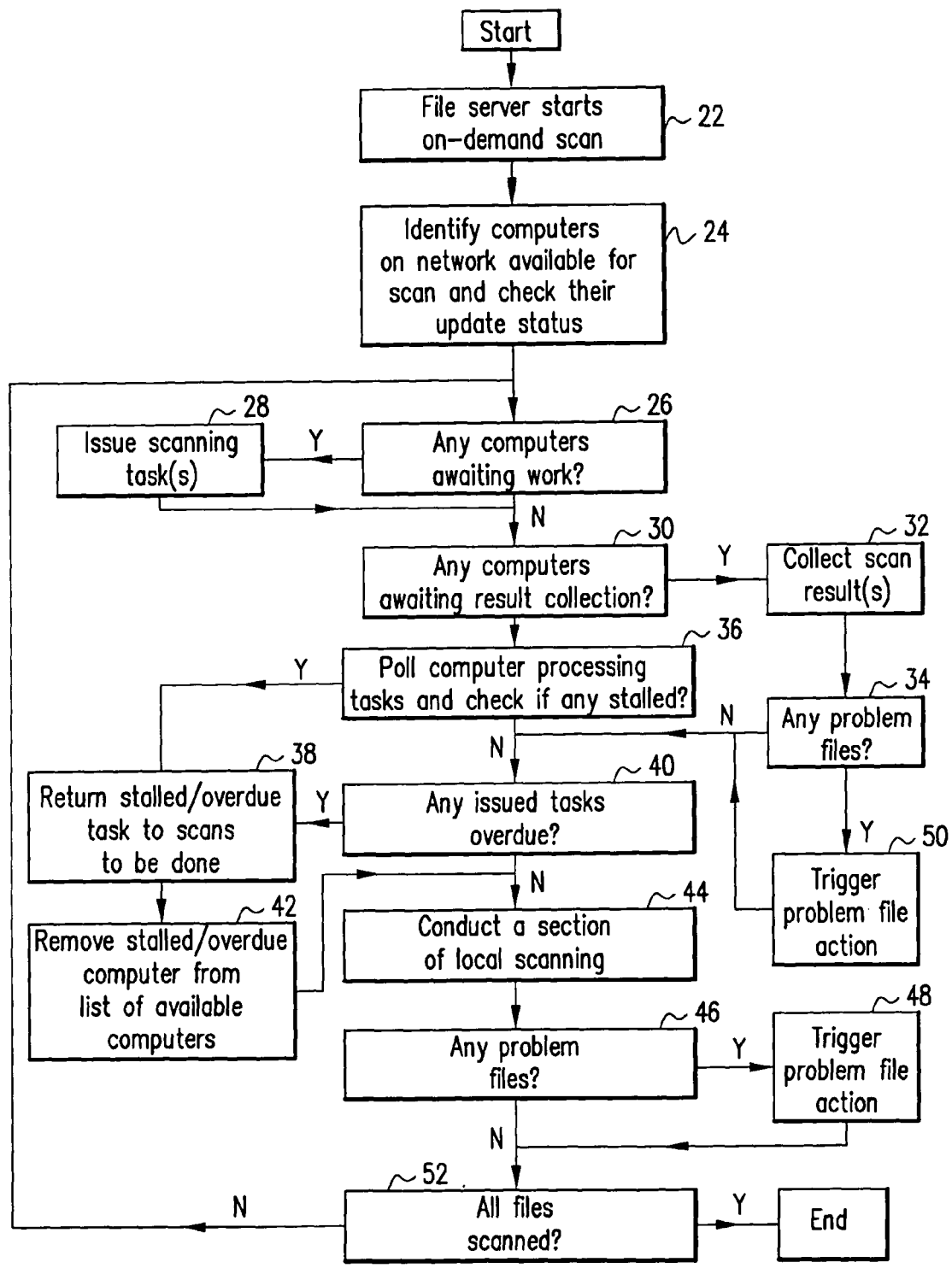
FIG. 2 illustrates is a flow diagram illustrating the processing of a master computer controlling distributed scanning.

FIG. 2 is a flow diagram illustrating the processing performed by the file server 4 in accordance with one example of the invention (it will be understood that any master control computer on the network could perform this role). At step 22 a file server starts an on-demand scan on the network storage device 18. This may be triggered as a scheduled event or in response to a specific user input. The on-demand scan could be triggered in other ways, for example a combination of factors such as low network activity and in excess of a minimum period since the last on-demand scan.

At step 24, the file server 4 identifies those computers on the network 16 that are available to assist with the scanning operations. The availability of a computer for taking part in the distributed processing may be detected by issuing a polling request to all connected computers. The connected computers could themselves be operating in accordance with a schedule that indicates that they were available for such use during predetermined known quiet times. Alternatively, a screen-saver operating or other idling mode indicating parameter (such as activation of a power saving mode) could be used as indicating that a particular computer was available to take part in the scanning activity. Step 24 also serves to check that the computers indicated as available for the scanning operation have the latest copy of the virus definition data or content filtering data available to them. If a particular computer indicates an out-of-date set of data, then updated data may be downloaded from the file server 4 or a remote site, such as a virus program provider's FTP site.

At step 26, the file server (master computer) 4 checks to see if any computers 8, 10, 12, 14, 20 that are available for taking part in the distributed processing are available to have a task allocated to them. If any such computers area available, then step 26 issues a scanning task to them. This scanning task may be to allocate a predetermined block of computer files on the network storage device 18 to that computer to be scanned for either computer viruses, unwanted computer programs, or restricted information contents depending upon the circumstances. The file server 4 may be arranged to itself check all of the computer files on the network storage device 18 for the highest priority items such as the latest released viruses, the most damaging viruses or other high priority unwanted content. In these circumstances, the bulk of the lower priority scanning may be offloaded to the distributed further computers on the network 2. At step 30, the file server 4 checks to see if any of the further computers to which tasks have been issued is waiting to send results back to the file server 4. If results are ready to be sent back, then these are collected at step 32 and any necessary action in response to detected problem files is taken at step 34.

If no results are awaiting collection, then processing proceeds to step 36 at which all of the computers who have been issued tasks are polled to respond to indicate that they are all still processing their allocated tasks normally, even though they have not yet finished. If any of the further computers indicates a status showing that normal processing is not continuing, then control passes to step 38 for remedial action.

If all the poll results indicate normal processing, then step 40 checks to see if any of the computers is overdue for returning its results. It may be that a computer will respond normally to a polling request, but nevertheless be malfunctioning, and in this case the overdue nature of the result may be used to trigger remedial processing by step 38.

Step 38 is triggered when a task is not completing normally by a further computer and serves to return the allocated task to the list of tasks still to be performed. At step 42, the further computer may be subject to diagnostic exchanges to test whether it is fit to have further tasks allocated to it, and if not, the further computer may be removed from the list of further computers available to take part in the distributed processing.

At step 44, the issuing of tasks, the collection of results, and the testing of on-going tasks has all been performed by the file server 4 and accordingly the file server 4 can devote some processing resources to carrying out some of the scanning activities itself. These may be the highest priority and most critical scanning operations as previously mentioned. If any problem files are identified by this local scanning, then step 46 serves to trigger appropriate problem file action at step 48. The problem file action taken at step 48 may be the same as the problem file action taken at step 50 following a problem file detected by a further computer at step 32.

Step 52 serves to determine whether or not the scanning is complete. If further scanning operations are still required, then processing returns to step 26. Otherwise, the processing terminates.

Figure 3:
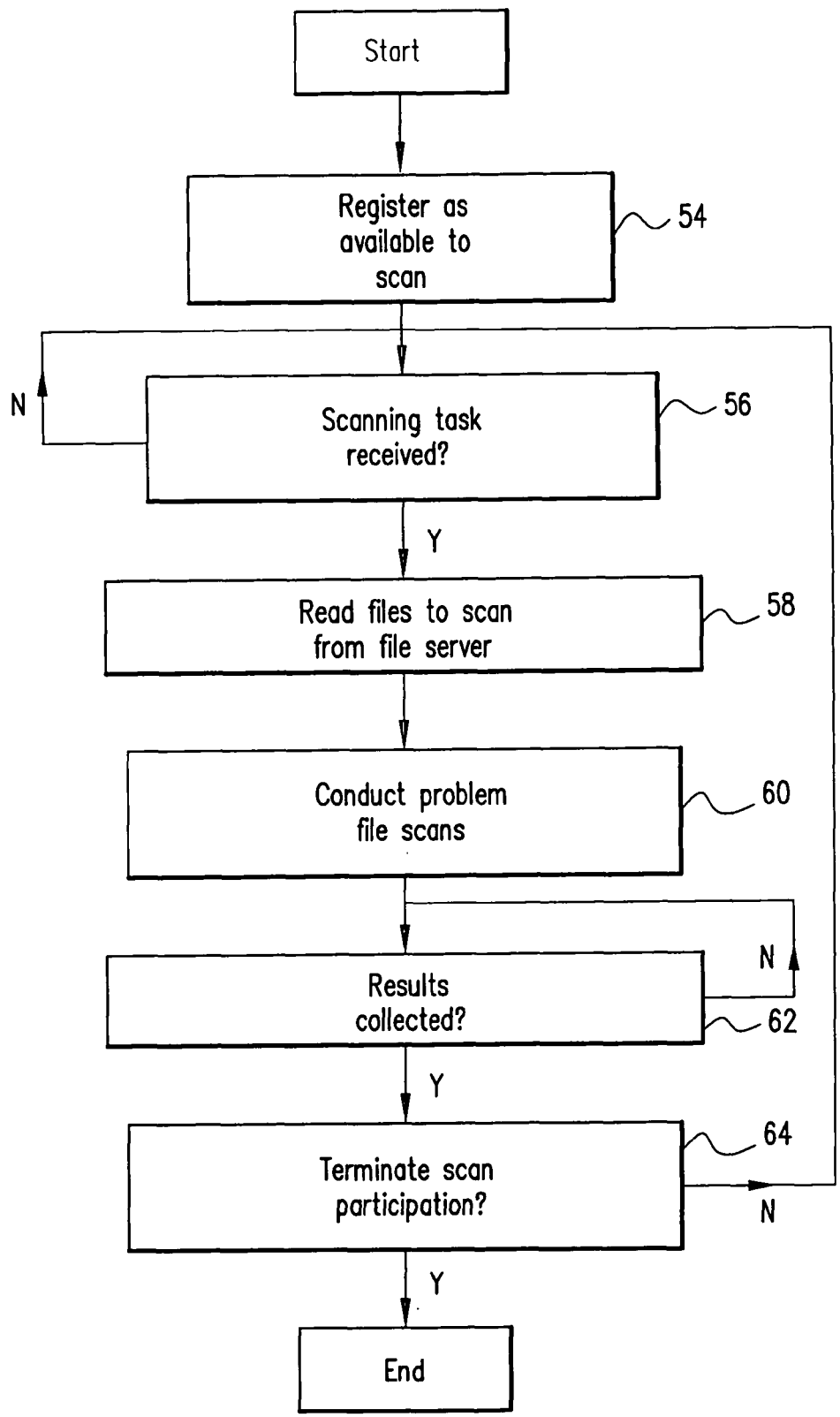
FIG. 3 is a flow diagram illustrating processing within a further computer taking part in distributed scanning.

FIG. 3 illustrates the processing that may take part in one of the further computers 8, 10, 12, 14, 20 illustrated in FIG. 1. At step 54, the further computer registers with the file server 4 as being available to take part in the scanning operations. This registration may be triggered as a result of a scheduled operation or alternatively may be triggered through starting of a screen saver program or through some other detected parameter. The further computer waits at step 56 until a scanning task is received from the file server 4. When a scanning task is received, then the further computer reads the files it is to scan from the network storage device 18 at step 58 and stores these locally. At step 60 it runs the scanning operations to detect the specified content (such as the presence of virus programs, worm programs, Trojan programs or the like or undesired content). When this scanning is completed, then processing waits at step 62 for the results to be collected from the further computer by the file server 4. At step 64, the further computer tests as to whether or not it should terminate its participation in the distributed processing, such as its scheduled availability coming to an end or its screen saver operations ceasing. If the further computer is to continue to participate, then processing returns to step 56. Otherwise, processing terminates.

Figure 4:
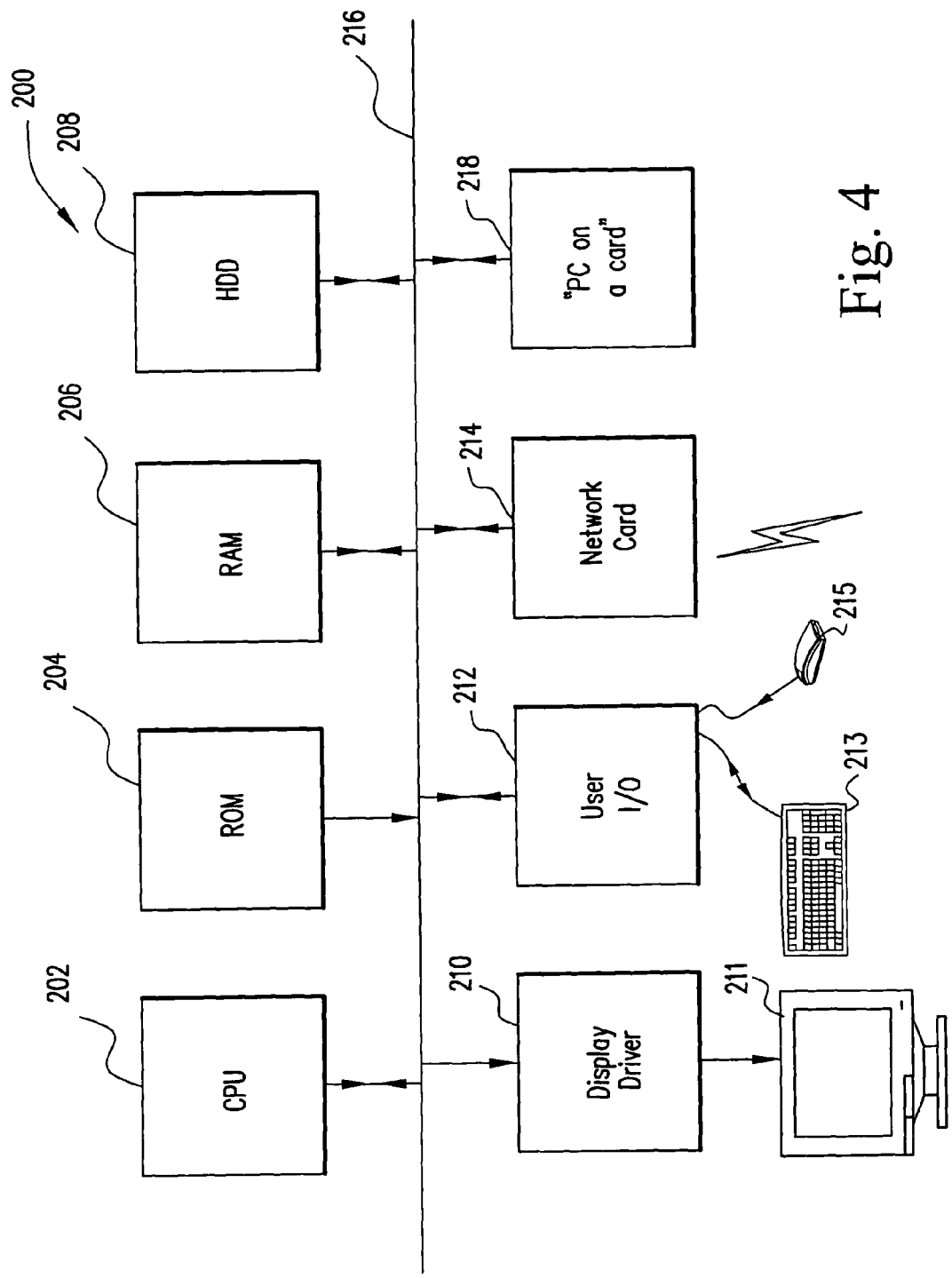
FIG. 4 schematically illustrates a general purpose computer of a type that may be used to perform scanning operations.

FIG. 4 illustrates a general purpose computer 200 of the type that may be used to perform the above described techniques. The general purpose computer 200 includes a central processing unit 202, a read only memory 204, a random access memory 206, a hard disk drive 208, a display driver 210 with attached display 211, a user input/output circuit 212 with attached keyboard 213 and mouse 215, a network card 214 connected to a network connection and a PC computer on a card 218 all connected to a common system bus 216. In operation, the central processing unit 202 executes a computer program that may be stored within the read only memory 204, the random access memory 206, the hard disk drive 208 or downloaded over the network card 214. Results of this processing may be displayed on the display 211 via the display driver 210. User inputs for triggering and controlling the processing are received via the user input/output circuit 212 from the keyboard 213 and mouse 215. The central processing unit 202 may use the random access 206 as its working memory. A computer program may be loaded into the computer 200 via a recording medium such as a floppy disk drive or compact disk. Alternatively, the computer program may be loaded in via the network card 214 from a remote storage drive. The PC on a card 218 may comprise its own essentially independent computer with its own working memory, CPU and other control circuitry that can co-operate with the other elements in FIG. 4 via the system bus 216. The system bus 216 is a comparatively high bandwidth connection allowing rapid and efficient communication.

It will be appreciated that the above computer apparatus is only one example of the computer platforms that may operate in accordance with the present techniques. As examples, handheld computers and interactive televisions may be used. The display driver may also serve to provide audio output and the input devices may include pen based devices, cameras (for automated recognition) and microphones. The hard disk drive may be replaces or supplemented with a floppies disk drive, a CD/DVD drive or memory cards. It will be understood that these are only some examples of the variation in computer platform that may be used as appropriate.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product, embodied on a non-transitory machine readable medium, that, when executed, causes a processor to perform operations comprising:
   notifying an external computer of an availability of the processor in response to a determination that the processor has executed a screen-saver or has activated a power saving mode;
   notifying said external computer of an update status level;
   downloading definition or filtering data based at least in part on the update status level;
   receiving a task request from said external computer specifying a portion of a scan operation including a scan of a plurality of computer files to identify one or more of said plurality of computer files having one or more predetermined characteristics;
   performing said portion of said scan operation including the scan, the scan defined by the definition or filtering data; and
   reporting a result of said portion of said scan operation to said external computer.

2. A computer program product as claimed in claim 1, wherein the scan identifies said one or more of said plurality of computer files containing a specified computer program.

3. A computer program product as claimed in claim 2, wherein said specified computer program is a computer virus or worm.

4. A computer program product as claimed in claim 1, wherein the scan identifies said one or more of said plurality of computer files containing content to be banned, redirected or quarantined.

5. A computer program product as claimed in claim 1, wherein said plurality of computer files comprise computer files stored on one or more networked data storage devices.

6. A computer program product as claimed in claim 1, wherein said plurality of computer files comprise network data traffic.

7. A computer program product as claimed in claim 1, the operations further comprising:
reporting, responsive to a poll request from said external computer, a status of a processing of said portion of said scan operation.

8. A computer program product as claimed in claim 1, wherein said result of said portion of said scan operation identifies one or more of said plurality of computer files.

9. A method implemented by a computer, the method comprising:
initiating a scan of a plurality of computer files, utilizing a hardware processor;
dividing said scan into a plurality of tasks including high priority tasks and low priority tasks;
performing said high priority tasks with said computer;
issuing, from said computer, at least some of said low priority tasks to one or more further computers;
receiving from said one or more further computers results of at least some of said low priority tasks; and
in response to the receiving, identifying, based on said high priority tasks and the results, one or more of said plurality of computer files containing a computer virus, worm or Trojan.

10. A method as claimed in claim 9, wherein said plurality of computer files comprise computer files stored on one or more networked data storage devices.

11. A method as claimed in claim 9, wherein said plurality of computer files comprise network data traffic.

12. A method as claimed in claim 9, wherein said plurality of computer files are stored remotely from said computer.

13. A method as claimed in claim 9, further comprising:
monitoring an execution of said low priority tasks by said one or more further computers.

14. A method as claimed in claim 9, further comprising:
if one of said low priority tasks has been pending with a further computer for more than a predetermined time, reissuing said one of said low priority tasks to another computer.

15. A method as claimed in claim 14, wherein, if said one of said low priority tasks has been pending with said further computer for more than said predetermined time, a diagnostic process for said further computer is initiated.

16. A method as claimed in claim 14, wherein, if said one of said low priority tasks has been pending with said further computer for more than said predetermined time, then further tasks to said further computer are not issued and said further computer is removed from a list of further computers available to receive task requests.

17. A method as claimed in claim 9, further comprising:
checking that said one or more further computers have a latest copy of definition or filtering data.

18. A method as claimed in claim 9, wherein said high priority tasks include checking said one or more of said plurality of computer files for a first virus that is more recently released or is more damaging than a second virus for which the low priority tasks check said one or more of said plurality of computer files.

19. A method, comprising:
notifying an external computer of an availability of a hardware processor in response to a determination that the hardware processor has executed a screen-saver or has activated a power saving mode;
notifying said external computer of an update status level;
downloading definition or filtering data based at least in part on the update status level;
receiving a task request from said external computer specifying a portion of a scan operation including a scan of a plurality of computer files to identify one or more of said plurality of computer files having one or more predetermined characteristics;
performing said portion of said scan operation including the scan, utilizing said hardware processor, the scan defined by the definition or filtering data; and
reporting a result of said portion of said scan operation to said external computer.

20. A method as claimed in claim 19, wherein the scan identifies said one or more of said plurality of computer files containing a computer virus or worm.

21. An apparatus, comprising:
a network interface that notifies an external computer of an availability of a hardware processor in response to a determination that the hardware processor has executed a screen-saver or has activated a power saving mode, notifies said external computer of an update status level, downloads definition or filtering data based at least in part on the update status level, and receives a task request from said external computer specifying a portion of a scan operation including a scan of a plurality of computer files to identify one or more of said plurality of computer files having one or more predetermined characteristics; and
a processing unit configured to perform said portion of said scan operation including the scan, utilizing said hardware processor, the scan defined by the definition or filtering data, wherein the network interface reports a result of said portion of said scan operation to said external computer.

22. An apparatus as claimed in claim 21, wherein the scan identifies said one or more of said plurality of computer files containing a computer virus or worm.

* * * * *